(12) United States Patent
Karato

(10) Patent No.: US 6,602,942 B1
(45) Date of Patent: Aug. 5, 2003

(54) OIL-EXTENDED RUBBER, PROCESS FOR PRODUCING THE SAME, RUBBER COMPOSITION, AND CROSSLINKED OBJECT

(75) Inventor: Takeshi Karato, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 09/926,253

(22) PCT Filed: Mar. 31, 2000

(86) PCT No.: PCT/JP00/02082

§ 371 (c)(1),
(2), (4) Date: Oct. 1, 2001

(87) PCT Pub. No.: WO00/58397

PCT Pub. Date: Oct. 5, 2000

(30) Foreign Application Priority Data

Mar. 31, 1999 (JP) ............................................ 11-091573

(51) Int. Cl.$^7$ ................................................. C08L 5/01
(52) U.S. Cl. ........................ 524/474; 524/490; 524/491; 524/571; 524/575
(58) Field of Search ................................ 524/571, 575, 524/490, 491, 474

(56) References Cited

U.S. PATENT DOCUMENTS

| | | | | |
|---|---|---|---|---|
| 3,925,514 A | * | 12/1975 | Kohler et al. | 260/889 |
| 4,521,296 A | * | 6/1985 | Kunihiro et al. | 208/87 |
| 4,547,560 A | * | 10/1985 | Hattori et al. | 526/340 |
| 4,677,165 A | * | 6/1987 | Kikuchi et al. | 525/332.9 |
| 5,330,829 A | * | 7/1994 | Miller | 428/286 |
| 5,550,200 A | | 8/1996 | Shibata et al. | 526/174 |
| 6,248,929 B1 | * | 6/2001 | Kaimai et al. | 585/241 |
| 6,399,697 B1 | * | 6/2002 | Takasaki et al. | 524/575 |

FOREIGN PATENT DOCUMENTS

| | | | | |
|---|---|---|---|---|
| EP | 1 188 789 A1 | * | 3/2002 | C08L/9/00 |
| JP | 61-197645 A | * | 9/1986 | C08L/9/06 |
| JP | 63-215729 A | * | 9/1988 | C08J/3/20 |
| WO | WO 00/58397 A1 | * | 10/2000 | C08L/9/00 |

OTHER PUBLICATIONS

Patent Abstract of Japan; Publication No. 03009910; Publication date: Jan. 17, 1991 (abstract only).
Patent Abstracts of Japan; Publication No. 61255908; Publication date: Nov. 13, 1986 (abstract only).
Patent Abstracts of Japan; Publication No. 61197645; Publication date: Sep. 1, 1986 (abstract only).

* cited by examiner

Primary Examiner—David W. Wu
Assistant Examiner—Rip A Lee
(74) Attorney, Agent, or Firm—Armstrong, Westerman & Hattori, LLP.

(57) ABSTRACT

An oil-extended rubber comprising 100 weight parts of a rubber ingredient comprising a conjugated diene rubber wherein the ratio (Mw/Mn) of weight average molecular weight (Mw) to number average molecular weight (Mn) is in the range of 1.2 to 2.2, and the conjugated diene monomer units have a vinyl bond unit content of at least 20%, and 5–100 weight parts of a process oil having a total acid value of not larger than 1.0 mgKOH/g, a pour point of not higher than 50° C. and an aromatic carbon content of at least 20%. A rubber composition comprising 100 weight parts of the above-mentioned rubber ingredients, 5–100 weight parts of the process oil and 10–200 weight parts of a reinforcing agent. This rubber composition gives a crosslinked article having high tensile strength, high abrasion resistance and reduced heat build-up, and is useful, for example, as an automobile tire material.

21 Claims, No Drawings

OIL-EXTENDED RUBBER, PROCESS FOR PRODUCING THE SAME, RUBBER COMPOSITION, AND CROSSLINKED OBJECT

TECHNICAL FIELD

This invention relates to an oil-extended rubber used as a material for a crosslinked rubber article having excellent tensile strength, abrasion resistance and reduced heat build-up; a process for producing the oil-extended rubber; a rubber composition comprising the oil-extended rubber and a reinforcing agent; and a crosslinked rubber article made by crosslinking the rubber composition.

BACKGROUND ART

An attempt has hitherto been made for improving tensile strength and abrasion resistance of rubber. Widely adopted examples of the attempt include a method of using a rubber having a high molecular weight and a method of modifying a rubber by incorporating a reinforcing agent therein. However, the high molecular weight rubber has a high viscosity, and the rubber composition having incorporated therein a reinforcing agent is rigid. Therefore, these rubbers have poor processability.

Serious consideration is now given for material resource saving and environmental protection, and thus a severe requirement is imposed for reducing fuel consumption of automobiles. As for automobile tires, for which a rubber material is enormously consumed, there is an increasing demand for providing tires having a reduced rolling resistance to reduce fuel consumption of automobiles.

A crosslinked rubber product exhibiting a low heat build-up is generally used for producing tires having a reduced rolling resistance. A crosslinked rubber product made from a diene rubber composition having incorporated therein silica as a reinforcing agent has been proposed as a crosslinked rubber exhibiting a low heat build-up. However, the crosslinked rubber product made from a silica-incorporated diene rubber composition has a problem such that abrasion resistance and tensile strength are poor as compared with a crosslinked rubber product made from a widely used diene rubber composition having carbon black incorporated therein.

To enhance the abrasion resistance of a crosslinked rubber product made from a silica-incorporated rubber composition, a method of increasing the molecular weight of rubber and a method of increasing the amount of silica to be incorporated in a rubber composition are adopted. These methods still have problems such that processability of the rubber composition is reduced and a crosslinked rubber product made therefrom becomes rigid with the result of reduction of road surface holding of tires.

To impart good processability to a rubber composition, a method of using a rubber having a specific molecular weight distribution was proposed in Japanese Unexamined Patent Publication No. S61-255908. However, a crosslinked rubber product made from this rubber composition has a problem in that heat build-up is large.

To improve processability of a rubber composition, a method of incorporating a process oil therein was proposed, for example, in Japanese Unexamined Patent Publication No. H7-292161. However, a crosslinked rubber product made from the oil-extended rubber composition has greatly reduced abrasion resistance and tensile strength.

DISCLOSURE OF THE INVENTION

An object of the present invention is to provide an oil-extended rubber which gives a rubber composition exhibiting good processability when a reinforcing agent is incorporated therewith, and which rubber composition gives a crosslinked rubber article having high tensile strength, high abrasion resistance and low heat build-up.

The present inventors carried out research into a rubber material exhibiting good processability even when a reinforcing agent is incorporated therewith, and giving a crosslinked rubber product having high tensile strength, high abrasion resistance and low heat build-up. As a result thereof, it has been found that the above object can be achieved by an oil-extended rubber comprising a specific rubber ingredient extended with a specific process oil. Thus, the present invention has been completed.

In one aspect of the present invention, there is provided an oil-extended rubber comprising 100 parts by weight of a rubber ingredient comprising a conjugated diene rubber wherein the ratio (Mw/Mn) of weight average molecular weight (Mw) to number average molecular weight (Mn), as measured by gel permeation chromatography and expressed in terms of those of polystyrene, is in the range of 1.2 to 2.2, and the conjugated diene monomer units have a vinyl bond unit content of at least 20%, and 5 to 100 parts by weight of a process oil having a total acid value of not larger than 1.0 mgKOH/g, a pour point of not higher than 50° C. and an aromatic carbon content of at least 20% as measured by the Kurtz analysis method.

In another aspect of the present invention, there is provided a process for producing the above-mentioned oil-extended rubber, which comprises the steps of (1) polymerizing a conjugated diene monomer or monomers alone, or a combination of a conjugated diene monomer or monomers with a monomer copolymerizable therewith by using an organic active metal initiator in the presence of a polar compound in a hydrocarbon medium; (2) adding a terminator to a polymerization system to terminate the polymerization; (3) adding 5 to 100 parts by weight, based on 100 parts by weight of the total monomers, of a process oil having a total acid value of not larger than 1.0 mgKOH/g, a pour point of not higher than 50° C. and an aromatic carbon content of at least 20% as measured by the Kurtz analysis method; and (4) removing the hydrocarbon medium and recovering the thus-produced oil-extended rubber.

In a further aspect of the present invention, there is provided a rubber composition comprising (i) 100 parts by weight of a rubber ingredient comprising a conjugated diene rubber wherein the ratio (Mw/Mn) of weight average molecular weight (Mw) to number average molecular weight (Mn), as measured by gel permeation chromatography and expressed in terms of those of polystyrene, is in the range of 1.2 to 2.2, and the conjugated diene monomer units have a vinyl bond unit content of at least 20%, (ii) 5 to 100 parts by weight of a process oil having a total acid value of not larger than 1.0 mgKOH/g, a pour point of not higher than 50° C. and an aromatic carbon content of at least 20% as measured by the Kurt analysis method, and (iii) 10 to 200 parts by weight of a reinforcing agent.

BEST MODE FOR CARRYING OUT THE INVENTION

Oil-Extended Rubber

The oil-extended rubber of the present invention comprises a specific rubber ingredient and a specific process oil.

Rubber Ingredient

A rubber ingredient contained in the oil-extended rubber of the present invention comprises as an indispensable ingredient a conjugated diene rubber wherein the molecular weight distribution (Mw/Mn) is in the range of 1.2 to 2.2. By the term "conjugated diene rubber" used herein, we mean a rubber comprised of conjugated diene monomer units in the backbone chain. This polymer includes a homopolymer of a conjugated diene monomer and a copolymer of at least two conjugated diene monomers, and a copolymer of a conjugated diene monomer and a monomer copolymerizable therewith.

The rubber ingredient may comprise either a single kind of conjugated diene rubber or a mixture of two or more kinds of conjugated diene rubbers. The rubber ingredient may contain a rubber having no conjugated diene monomer units. The content of the conjugated diene rubber in the rubber ingredient is preferably at least 50% by weight, more preferably at least 60% and especially preferably at least 70% by weight.

As specific examples of the conjugated diene monomer, there can be mentioned 1,3-butadiene, 2-methyl-1,3-butadiene, 2,3-dimethyl-1,3-butadiene, 2-chloro-1,3-butadiene and 1,3-pentadiene. Of these, 1,3-butadiene and 2-methyl-1,3-butadiene are preferable, 1,3-Butadiene is most preferable. These conjugated diene monomers may be used either alone or as a combination of at least two thereof.

The monomer copolymerizable with the conjugated diene monomer is not particularly limited, and includes, for example, an amino group-containing vinyl monomer, a pyridyl group-containing vinyl monomer, a hydroxyl group-containing vinyl monomer, an alkoxyl group-containing vinyl monomer and an aromatic vinyl monomer.

Of these, an aromatic vinyl monomer is preferable. As specific examples of the aromatic vinyl monomer, there can be mentioned styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene. Of these, styrene is especially preferable. The copolymerizable monomers may be used either alone or as a combination of at least two thereof. The kind and amount of the copolymerizable monomer is appropriately chosen depending upon the particular use of rubber.

The content of conjugated diene monomer units in the conjugated diene rubber is such that the lower limit thereof is preferably 50%, more preferably 60% and especially preferably 70%, and the upper limit thereof is 100%, preferably 95%, more preferably 92% and especially preferably 90%. When the content of conjugated diene monomer units is too small, the properties desired for a conjugated diene rubber tend to be deteriorated.

In the case where the conjugated diene rubber is a copolymer of a conjugated diene monomer with a copolymerizable monomer, the sequence distribution of the copolymerizable monomer units in the copolymer is not particularly limited. However, the content of an isolated short chain of a copolymerizable monomer unit, i.e., the content of a copolymerizable monomer unit, which is adjacent only to conjugated diene monomer units in the copolymer, is such that the lower limit thereof is preferably 50% by weight, more preferably 60% and especially preferably 70% by weight, and the upper limit thereof is 100% by weight, based on the total content of the copolymerizable monomer units. The content of a long sequence of copolymerizable monomer units, i.e, a sequence composed of at least eight sequential copolymerizable monomer units, in the copolymer, is such that the lower limit thereof is 0% by weight, and the upper limit thereof is preferably 2% by weight, more preferably 1% by weight and especially preferably 0.5% by weight, based on the total content of the copolymerizable monomer units. When the sequence distribution of the copolymerizable monomer units is satisfactory as mentioned above, a crosslinked rubber product made from a rubber composition comprising the oil-extended rubber has excellent tensile strength, abrasion resistance and heat build-up.

The content of vinyl bond units (i.e., the sum of 1,2-vinyl bond units and 3,4-vinyl bond units) in the conjugated diene rubber constituting the rubber ingredient is such that the lower limit thereof is 20% by weight, preferably 40% by weight and more preferably 50% by weight, and the upper limit thereof is preferably 90% by weight, more preferably 85% by weight and especially preferably 80% by weight, based on the total weight of the conjugated diene monomer units. If the content of vinyl bond units is too small, a crosslinked rubber product made from the rubber composition tends to have poor tensile strength and poor abrasion resistance. In contrast, a conjugated diene rubber having a too large content of vinyl bond units is difficult to produce. Conjugated diene monomer units other than vinyl bond units are 1,4-bond units, and the 1,4-bond units in a conjugated diene rubber may be either 1,4-cis-bond units or 1,4-trans-bond units, or both of 1,4-cis-bond units and 1,4-trans-bond units.

The weight average molecular weight (Mw) of the conjugated diene rubber as measured by gel permeation chromatography (GPC) and expressed in terms of that of polystyrene is such that the lower limit thereof is preferably 200,000, more preferably 400,000 and especially preferably 600,000, and the upper limit thereof is preferably 2,000,000, more preferably 1,500,000 and especially preferably 1,200,000. When the weight average molecular weight (Mw) of the conjugated diene rubber is too small, a crosslinked rubber product made from the rubber composition tends to have large heat build-up, poor abrasion resistance and poor tensile stress. In contrast, when Mw is too large, the rubber composition tends to have poor processability. The conjugated diene rubber may be such that it has been modified with a coupling agent to enhance the molecular weight.

The molecular weight distribution of the conjugated diene rubber, namely, the ratio (Mw/Mn) of weight average molecular weight (Mw) to number average molecular weight (Mn) is such that the lower limit thereof is 1.2, preferably 1.3 and more preferably 1.4, and the upper limit thereof is 2.2, preferably 2.1 and more preferably 2.0. If the molecular weight distribution (Mw/Mn) of the conjugated diene rubber is too small, the rubber composition tends to have poor processability. In contrast, if Mw/Mn is too large, a crosslinked rubber product made from the rubber composition tends to have large heat build-up, poor tensile strength and poor abrasion resistance.

The rubber ingredient preferably contains a conjugated diene rubber having a polar group, especially a conjugated diene rubber having an amino group or an alkoxysilyl group. In the case where the rubber ingredient contains a conjugated diene rubber having a polar group, a uniform dispersion of a reinforcing agent in an oil-extended rubber can be easily obtained at a step of preparing a reinforcing agent-containing rubber composition, and, if silica is used as a reinforcing agent, a high adhesion between the oil-extended rubber and silica can be obtained. The content of the conjugated diene rubber having a polar group in the rubber ingredient is such that the lower limit thereof is preferably 10% by weight, more preferably 20% by weight, especially preferably 30% by weight and most preferably 40% by weight, and the upper limit thereof is 100% by weight. The conjugated diene rubber having a polar group is prepared by copolymerization of a monomer having a polar group, or modification of a conjugated diene rubber with a polar group-containing compound.

Process Oil

The process oil used for the preparation of an oil-extended rubber of the present invention has a small total acid value. The upper limit of the total acid value is 1.0 mgKOH/g, preferably 0.4 mgKOH/g and more preferably 0.1 mgKOH/g. The total acid value means an amount of the total acid ingredients in the process oil, as expressed by an amount of potassium hydroxide required for neutralize the total acid ingredients contained in 1 gram of the process oil. If a process oil having a too large total acid value is used, a crosslinked rubber product made from the rubber composition tends to have large heat build-up and poor abrasion resistance.

The process oil can be such that is prepared by allowing a process oil having a total acid value of larger than 1.0 mgKOH/g to react with a basic compound to reduce the total acid value to 1.0 mgKOH/g or smaller. It is possible that a process oil having a total acid value of larger than 1.0 mgKOH/g is incorporated with a basic compound in an amount required for reducing the total acid value to 1.0 mgKOH/g or smaller, and a conjugated diene rubber is extended with the thus-obtained process oil/basic compound mixture whereby the total acid value of larger than 1.0 mgKOH/g is reduced to 1.0 mgKOH/g or smaller during extending.

The process oil used in the present invention has a pour point of not higher than 50° C., preferably not higher than 30° C. and more preferably not higher than 10° C. The lower limit of the pour point is not particularly limited, but is preferably −20° C. and more preferably −10° C. When the pour point is not higher than 50° C., a crosslinked product made from the rubber composition exhibits excellent heat build-up. A process oil having a too high pour point exhibits a high viscosity and a conjugated diene rubber is occasionally difficult to extend with the process oil. In contrast, a process oil having a too low pour point tends to give a crosslinked rubber product having poor abrasion resistance.

The process oil used in the present invention has an aromatic carbon content (CA%) of at least 20%, preferably at least 22% and more preferably at least 25% as measured by the Kurtz analysis method. The upper limit of the aromatic carbon content is not particularly limited and is 100%. The process oil preferably has a paraffinic carbon content (CP%) of not larger than 55%, more preferably not larger than 50% and especially preferably not larger than 45%. The lower limit of the paraffinic carbon content is not particularly limited. If CA% is too small or CP% is too large, a crosslinked rubber product made from the rubber composition tends to have poor tensile strength and poor abrasion resistance.

The content of an aromatic polyoyclic hydrocarbon in the process oil used in the present invention is preferably smaller than 3%. The content of an aromatic polycyclic hydrocarbon in the process oil can be measured by the method of IP346 (testing method according to the Institute Petroleum of United Kingdom).

Oil-Extended Rubber

The oil-extended rubber of the present invention comprises the above-mentioned conjugated diene rubber and the above-mentioned process oil. The amount of the process oil is 5 to 100 parts by weight based on 100 parts by weight of the rubber ingredient. The lower limit of the process oil is preferably 10 parts by weight, more preferably 20 parts by weight, and the upper limit thereof is preferably 80 parts by weight, more preferably 60 parts by weight.

The Mooney viscosity of the oil-extended rubber is not particularly limited, but the lower limit thereof is preferably 20, more preferably 25 and especially preferably 30, and the upper limit thereof is preferably 100, more preferably 90 and especially preferably 80. If the Mooney viscosity is too small, a crosslinked rubber product made from the rubber composition is liable to have large heat build-up and poor abrasion resistance. In contrast, if the Mooney viscosity is too large, the rubber composition is liable to have poor processability.

Process for Producing Oil-Extended Rubber

The above-mentioned oil-extended rubber is produced by a process comprising (1) a step of polymerizing a conjugated diene monomer or monomers, (2) a step of terminating polymerization, (3) a step of incorporating the process oil, and (4) a step of recovering the oil-extended rubber. The process for producing the oil-extended oil will be explained in the sequence of steps.

Polymerization Step

A conjugated diene monomer or monomers are polymerized by using an organic active metal initiator in the presence of a polar compound in a hydrocarbon medium. The conjugated diene monomer or monomers are used either alone or as a combination thereof with a monomer copolymerizable therewith. The kind of the conjugated diene monomer or monomers, the kind of the optional copolymerizable monomer, and the ratio of comonomers are described above with reference to the conjugated diene rubber.

The polymerization is carried out in a hydrocarbon medium. The hydrocarbon solvent used in the polymerization step includes aliphatic hydrocarbons, alicyclic hydrocarbons and aromatic hydrocarbons. The hydrocarbon may be used either alone or as a combination of at least two thereof. The amount of hydrocarbon is preferably such that the concentration of monomers is in the range of 1% to 30% by weight.

An organic active metal initiator is used as a polymerization initiator. The organic active metal initiator preferably includes organo-alkali-metal compounds. As specific examples of the organo-alkali-metal compound, there can be mentioned organolithium compounds such as an organomonolithium compound and a polyvalent organolithium compound, organosodium compounds, and organopotassium compounds. Of these, organolithium compounds are preferable. oragano-monolithium compound is especially preferable. The organic active metal initiator may be used alone or as a combination of at least two thereof. The amount of organic active metal initiator is appropriately chosen depending upon the molecular weight of intended polymer to be produced, but is preferably in the range of 0.1 to 30 milli-mole per 100 g of monomer.

To obtain a conjugated diene rubber having the desired content of vinyl bond units, the polymerization is carried out in the presence of a polar compound. The amount of polar compound is preferably in the range of 0.5 to 100 moles per mole of organic active metal initiator. If the amount of polar compound is too small, the content of vinyl bond units in a conjugated diene polymer is reduced. As specific examples of the polar compound, there can be mentioned ethers such as tetrahydrofuran, diethyl ether, dioxane, ethylene glycol dimethyl ether, ethylene glycol dibutyl ether, diethylene glycol dimethyl ether and diethylene glycol dibutyl ether;

tertiary amines such as tetramethylethylenediamine, trimethylamine, triethylamine, pyridine and quinuclidine; alakli metal alkoxide compounds such as potassium-t-amyloxide and potassium-t-butoxide; and phosphine compounds such as triphenylphosphine. Of these, ethers and tertiary amines are preferable.

The polymerization reaction is carried out preferably at a temperature of −78 to 150° C. The polymerization manner can be either batchwise or continuous. Batchwise polymerization is preferable.

Modification Step

When the polymerization is carried out by using an organic active metal initiator in the above-mentioned manner, a polymer having an organic active metal bound to a terminal of the polymer chain thereof is produced. The thus-produced polymer having an organic active metal bound to a terminal of the polymer chain can be modified by allowing a modifier to react with the polymer. More specifically, when a terminal modifier is allowed to react with the polymer chain, an atomic group such as a polar group can be introduced to the site of the polymer chain, to which an organic active metal has been bound. The conjugated diene rubber used in the present invention may be either modified or unmodified. When the conjugated diene rubber is modified, the modification is preferably conducted at a modification step intervening between the polymerization step and the polymerization terminating step.

The modifier used is not particularly limited, but a terminal modifier or a coupling agent is ordinarily used. When a terminal modifier is placed in contact with the polymer having an organic active metal bound to a terminal of the polymer chain, a terminal-modified conjugated diene rubber having a polar group introduced to the terminal thereof is produced. When a coupling agent is placed in contact with the polymer having an organic active metal bound to a terminal thereof, a conjugated diene rubber comprised of a coupled polymer is produced, which is formed by two or more of the organic active metal-bound polymer are bound through the coupling agent. As the coupling agent, a coupling agent having at least three sites to which the polymer chains are capable of being bound is preferably used.

The terminal modifier used is not particularly limited provided that it is capable of introducing a polar group to a polymer terminal. Among the terminal modifiers, those which are capable of introducing a tertiary amino group is preferable. As specific examples of such terminal modifiers, there can be mentioned N,N-di-substituted aminoalkyl acrylate and N,N-di-substituted aminoalkyl methacrylate; acrylamides and methacrylamides; N,N-di-substituted amino aromatic vinyl compounds; pyridyl group-containing vinyl compounds, N-substituted cyclic amides; N-substituted cyclic ureas, N-substituted aminoketones; N-substituted aminoaldehydes; N-substituted carbodiimides; and Schiff bases. These terminal modifiers may be used either alone or as a combination of at last two thereof. The amount of terminal modifier is appropriately chosen depending upon the particular properties required for a conjugated diene rubber, and is preferably in the range of 0.1 to 50 equivalent to the organic active metal.

After the terminal modification, a further modification treatment can be conducted. For example, in the case where a tertiary amino group is introduced to a polymer terminal by terminal modification, the resulting polymer can be further treated with a quaternarizing agent whereby the tertiary amino group in the polymer is converted to a quaternary amino group. As examples of the quaternarizing agent, there can be mentioned alkyl nitrates, potassium alkylsulfates, dialkyl sulfates, alkyl arylsulfonates, alkyl halides and metal halides.

The terminal modification is effected by placing a polymer having an organic active metal bound to a terminal thereof in contact with the terminal modifier. The reaction temperature and reaction time can be chosen in a broad range, but, the temperature and time are preferably in the ranges of 15 to 120° C. and 1 second to 10 hours, respectively. The modification percentage is preferably in the range of 10% to 100%. The modification percentage can be determined based on a calibration curve previously prepared, from a ratio (UV/RI) of an absorption intensity (UV) as measured by a visible spectrophotometer to an absorption intensity (RI) as measured by a differential refractometer in gel permeation chromatography.

When a coupling agent is placed in contact with a polymer chain having an organic active metal bound to a terminal thereof, a plurality of the polymers can be coupled together through the coupling agent at the respective sites of polymers to which the organic active metal has been bound. The coupling agent is not particularly limited provided that it is capable of giving a coupled polymer, and it includes, for example, tin-containing coupling agents, silicon-containing coupling agents, unsaturated nitrile coupling agent, ester coupling agents, halide coupling agents and phosphorus-containing coupling agents. These coupling agents may be used either alone or as a mixture of at least two thereof. The amount of coupling agent is preferably in the range of 0.1 to 10 equivalent to the organic active metal.

The temperature and time for the coupling reaction are preferably in the ranges of 0 to 150° C. and 0.5 second to 20 hours, respectively. The modification percentage can be appropriately chosen and is preferably in the range of 10% to 100%. The coupling percentage can be determined from peaks obtained by a differential refractometer on the GPC measurement conducted before and after the coupling. Namely, an area (A) of a peak obtained after the coupling, which occurs at the same position as that of a peak obtained before the coupling, is calculated. An area (B) of a peak occurring in a position corresponding to a molecular weight higher than that of the peak for (A) is calculated. The coupling percentage is a ratio of (B)/[(A)+(B)] in percents.

Polymerization terminating Step

To deactivate an organic active metal bound to a terminal of polymer chain, followed by removal of the organic active metal after completion of the polymerization step or after completion of the modification step, a terminator is added to a polymerization system to terminate polymerization. The terminator includes, for example, alcohols such as methanol and isopropanol. The amount of terminator used is preferably in the range of 0.1 to 50 equivalent to the organic active metal.

Process Oil Incorporating Step

The process oil used in the present invention is incorporated in a polymerization system wherein polymerization has been stopped by the addition of a terminator, and the mixture is thoroughly stirred to uniformly disperse the process oil in the polymerization system. According to the need, additive ingredients can also be incorporated at this process oil-incorporating step. For example, in the case where the polymer is heated in the succeeding steps of removing a polymerization medium and drying the polymer, a phenolic antioxidant, a phosphorus-containing antioxidant or a sulfur-containing antioxidant is preferably incorporated at the process oil-incorporating step. The amount of the antioxidant can be appropriately chosen depending upon the kind of antioxidant.

Recovering Step

In a recovering step, after incorporation of the process oil and other optional ingredients, a polymer, i.e., an oil-extended rubber comprising a polymer and the process oil, is recovered from a polymerization system.

The procedure by which the oil-extended rubber is recovered is not particularly limited. As examples of the recovering procedure, there can be mentioned a direct drying procedure wherein a polymerization mixture is dried to remove a polymerization medium by heating; a procedure wherein a polymerization mixture is introduced in a poor solvent for the obtained rubber to precipitate an oil-extended rubber, and the rubber is recovered by, for example, filtration, followed by drying to remove the solvent; and a steam stripping procedure wherein high-temperature steam is blown into a polymerization mixture to remove a polymerization medium and simultaneously precipitate an oil-extended rubber of a crumb state in an aqueous medium formed from a condensed steam, and the rubber is recovered by, for example, filtration, followed by drying to remove the water. If impurities such as metal residue cannot be thoroughly removed in these recovering procedures, a procedure of dissolving the oil-extended oil in a good solvent and then a poor solvent is added to precipitate a rubber can be repeated, followed by washing and drying.

When the steam stripping procedure is carried out, a dispersing agent or a coagulating aid is incorporated in a polymerization mixture before the steam stripping, or a dispersing agent or a coagulating aid is incorporated in water in a stripping zone, and the water is blown together with high-temperature steam into a polymerization mixture. As the dispersing agent, an anionic surface active agent, a cationic surface active agent and a nonionic surface active agent are generally used. The amount of the dispersing agent incorporated in water in a stripping zone is preferably in the range of 0.1 to 3,000 ppm. As the coagulating aid, there can be mentioned, for example, water-soluble salts of metal such as lithium, sodium, potassium, magnesium, calcium, aluminum and tin.

To obtain a crumb of oil-extended rubber having a desired particle diameter, the concentration of oil-extended rubber crumb dispersed in water is preferably in the range of 0.1 to 20% by weight based on the weight of water in a stripping zone. The obtained wet crumb of oil-extended rubber is preferably dehydrated to a moisture content of 1 to 30% by weight. More specifically, the wet crumb is first dehydrated to a moisture content of 35 to 60% by weight by using a dehydrator such as a rotary screen, a vibrating screen or a centrifugal dehydrator. Then, the wet crumb is further dehydrated to a moisture content of 35 to 60% by weight, for example, by a compression squeezing machine such as a roll, a Banbury dehydrator or a screw-extruding type dehydrator. After dehydration, the crumb is dried preferably by a dryer such as a screw extruder, a kneader-type dryer, an expander dryer or hot air dryer to give an oil-extended rubber having a moisture content of below 1% by weight.

Rubber Composition

The rubber composition of the present invention comprises 100 parts by weight of a rubber ingredient comprising a conjugated diene rubber, 5 to 100 parts by weight of a process oil, 10 to 200 parts by weight of a reinforcing agent, and optional ingredients according to the need. The conjugated diene rubber and the process oil are as explained above with regard to the oil-extended rubber of the present invention. The rubber ingredient comprising the conjugated diene rubber and the process oil can be used in the form of the above-mentioned oil-extended rubber for the preparation of the rubber composition.

Reinforcing Agent

The reinforcing agent used is not particularly limited, but silica and carbon black can be used.

The silica is not particularly limited, and includes, for example, dry-process white carbon, wet-process white carbon, colloidal silica, and precipitated silica described in Japanese Unexamined Patent Publication No. S62-62838. Of these, wet-process silica predominantly comprised of hydrous silicic acid is especially preferable. The silica may be used either alone or as a combination of at least two thereof.

The specific surface area of silica is not particularly limited, but is such that the lower limit thereof is preferably 50 $m^2$/g, more preferably 100 $m^2$/g and especially preferably 120 $m^2$/g, and the upper limit thereof is preferably 400 $m^2$/g, more preferably 220 $m^2$/g and especially preferably 190 $m^2$/g, as the nitrogen absorption specific surface area as measured by the BET method. When the specific surface area is within this range, enhancement of tensile strength and abrasion resistance of a crosslinked rubber product made from the rubber composition, and reduction of heat build-up thereof can be well attained. The nitrogen absorption specific surface area is measured by the BET method according to ASTM D3037-81.

The carbon black is not particularly limited, and includes, for example, furnace black, acetylene black, thermal black, channel black and graphite. Of these, furnace black is especially preferable, which includes various grades such as SAF, ISAF, ISAP-HS, ISAF-LS, IISAF-HS, HAF, HAF-HS, HAF-LS and FEF. The carbon black may be used either alone or as a combination of at least two thereof.

The specific surface area of the carbon black is not particularly limited, but is such that the lower limit thereof is preferably 5 $m^2$/g, more preferably 50 $m^2$/g and especially preferably 80 $m^2$/g, and the upper limit thereof is preferably 200 $m^2$/g, more preferably 150 $m^2$/g and especially preferably 130 $m^2$/g, as the nitrogen absorption specific surface area as measured by the BET method. When the specific surface area is within this range, tensile strength and abrasion resistance of a crosslinked rubber product made from the rubber composition can be greatly enhanced.

The absorption of dibutyl phthalate (DBP) by the carbon black is also not particularly limited, but is such that the lower limit thereof is preferably 5 ml/100 g, more preferably 50 ml/100 g and especially preferably 80 ml/100 g, and the upper limit thereof is preferably 300 ml/100 g, more preferably 200 ml/100 g and especially preferably 160 ml/100 g. When the absorption of DBP is within this range, tensile strength and abrasion resistance of a crosslinked rubber product made from the rubber composition can be greatly enhanced.

The abrasion resistance can be more conspicuously improved by using high-structure carbon black having a specific surface area of 110 to 170 $m^2$/g, as measured by the method of absorption of cetyltrimethylammonium bromide (CTAB) as described in Japanese Unexamined Patent Publication No. H5-230290, and a DBP absorption of 110 to 130 ml/100 g as measured after 4 times' repeated compression at a pressure of 24,000 psi (24M4 DBP).

The amount of reinforcing agent is such that the lower limit thereof is preferably 10 parts by weight, more preferably 20 parts by weight and especially preferably 30 parts by weight, and the upper limit thereof is preferably 200 parts by weight, more preferably 150 parts by weight and especially preferably 120 parts by weight, based on 100 parts by weight of the rubber ingredient.

To attain the object of the present invention to a high degree, the reinforcing agent is comprised of either silica alone or a combination of silica with carbon black. In the case where silica is used in combination with carbon black, the mixing ratio of silica to carbon black is appropriately chosen depending upon the use or object of rubber, but is preferably in the range of 10/90 to 99/1, more preferably 30/70 to 95/5 and more preferably 50/50 to 90/10, by weight.

When silica is contained as a reinforcing agent in the rubber composition of the present invention, a silane coupling agent is preferably incorporated in addition to silica for further reducing the heat build-up and enhancing the abrasion resistance. The silane coupling agent is not particularly limited, and includes, for example, vinyltriethoxysilane, β-(3,4-epoxycyclohexyl)ethyltrimethoxysilane, N-(β-aminoethyl)-γ-aminopropyltrimethoxysilane, bis[3-(triethoxysilyl)propyl]tetrasulfide, bis[3-(triethoxysilyl)propyl]ditstrasulfide; and tetrasulfides such as γ-trimethoxysilylpropyldimethylthiocarbamyltetrasulfide and γ-trimethoxysilylpropylbenzothiazyltetrasulfide as described in Japanese Unexamined Patent Publication No. H6-248116. A silane coupling agent having not larger than 4 carbon atoms is preferably used because undesirable scorch can be avoided at kneading.

The silane coupling agent may be used either alone or in combination. The amount of silane coupling agent is such that the lower limit thereof is preferably 0.1 part by weight, more preferably 1 part by weight and especially preferably 2 parts by weight, and the upper limit thereof is preferably 30 parts by weight, more preferably 20 parts by weight and especially preferably 10 parts by weight, based on 100 parts by weight of silica.

Other Ingredients

The rubber composition of the present invention can contain desired amounts of various ingredients other than the above-mentioned oil-extended rubber and reinforcing agent, such as a crosslinking agent, a crosslinking accelerator, an accelerator activator, an antioxidant, an activator, a plasticizer, a lubricant and a filler.

When a rubber ingredient comprising a conjugated diene rubber is used as an oil-extended rubber, an additional rubber can be incorporated in addition to that contained in the oil-extended rubber, in the rubber composition. If the additional rubber is incorporated, the total weight of rubbers in the rubber composition increases, on the basis of which the amounts of reinforcing agent and other ingredients are determined. Namely, the amounts of reinforcing agent and other ingredients should be determined based on the total weight of the rubber including the additional rubber.

The content of vinyl bond units in the total conjugated diene rubber constituting the rubber ingredient in the rubber composition is the same as that described with regard to the oil-extended rubber of the present invention, that is, the lower limit thereof is 20% by weight, preferably 40% by weight and more preferably 50% by weight, and the upper limit thereof is preferably 90% by weight, more preferably 85% by weight and especially preferably 80% by weight, based on the total weight of the conjugated diene monomer units in the conjugated diene rubber.

The content of the conjugated diene rubber in the rubber ingredient contained in the rubber composition of the present invention is such that the lower limit thereof is preferably 50%, more preferably 60% and especially preferably 70%, and the upper limit is 100%, based on the weight of the rubber ingredient.

When a conjugated diene rubber having a polar group is incorporated, the content of conjugated diene rubber having a polar group, especially both of an amino group and an alkylsilyl group, in the rubber ingredient is also such that the lower limit thereof is preferably 10% by weight, more preferably 20% by weight, especially preferably 30% by weight and most preferably 40% by weight, and the upper limit thereof is 100% by weight, based on the total weight of the rubber ingredient. When an additional rubber is used in addition to the oil-extended rubber, a rubber composition of the present invention should be formulated so that a composition satisfying these requirements is obtained.

The total acid value of the process oil contained in the rubber composition is such that the upper limit thereof is preferably 1.0 mgKOH/g, more preferably 0.4 mgKOH/g especially preferably 0.1 mgKOH/g. The pour point of the process oil is such that the upper limit thereof is 50° C., preferably 30° C. and more preferably 10° C., and the lower limit thereof is preferably −20° C. and more preferably −10° C. The aromatic carbon content (CA%) of the process oil as measured by the Kurtz analysis method is such that the lower limit thereof is 20%, preferably 22% and more preferably 25%, and the upper limit thereof is 100%.

An additional process oil can be incorporated, in addition to that contained in the oil-extended rubber, in the rubber composition of the present invention. However, the total of the process oil contained in the rubber composition having incorporated therein the additional process oil must satisfy the above-mentioned requirements. As the process oil to be additionally incorporated, that which satisfies the above requirements is preferably used.

The paraffinic carbon content (CP%) of the process oil contained in the rubber composition is such that the lower limit thereof is 0%, and the upper limit thereof is preferably 55%, more preferably 50% and especially preferably 45%. The content of a polycyclic aromatic in the process oil is preferably below 3%.

The naphthenic carbon, content (CN%) in the process oil is not particularly limited, which is a value obtained by deducting the sum of CA% and CP% from 100%.

The amount of the process oil in the rubber composition is such that the lower limit thereof is preferably 5 parts by weight, more preferably 10 parts by weight and especially preferably 20 parts by weight, and the upper limit thereof is preferably 100 parts by weight more preferably 80 parts by weight and especially preferably 60 parts by weight, based on 100 parts by weight of the rubber ingredient. When an additional rubber and/or an additional process oil is incorporated in addition to those incorporated as the oil-extended rubber, the resulting rubber composition should satisfy this requirement.

A crosslinking agent is further incorporated in the rubber composition of the present invention, and thus, the rubber composition is used as a crosslinkable rubber composition.

The crosslinking agent is not particularly limited, and includes, for example, sulfur such as powdery sulfur, precipitated sulfur, colloidal sulfur, insoluble sulfur and highly dispersible sulfur; halogenated sulfur such as sulfur monochloride and sulfur dichloride; organic peroxides such as dicumyl peroxide and di-tert-butyl peroxide, quinone dioximes such as p-quinone dioxime and p,p'-dibenzoylquinone dioxime; organic polyamines such as triethylenetetraamine, hexamethylenediamine carbamate and 4,4'-methylene-bis-o-chloroaniline; and alkyl phenol resins having a methylol group. Of these, sulfur is preferable. Powdery sulfur is especially preferable. These crosslinking agents may be used either alone or as a combination of at least two thereof.

The amount of crosslinking agent is such that the lower limit thereof is preferably 0.1 part by weight, more preferably 0.3 part by weight and especially preferably 0.5 part by weight, and the upper limit thereof is preferably 15 parts by weight, more preferably 10 parts by weight and especially preferably 5 parts by weight, based on 100 parts by weight of the rubber ingredient. When the amount of crosslinking agent is within this range, a crosslinked rubber product made from the rubber composition has greatly reduced heat build-up, and greatly improved tensile strength and abrasion resistance.

As specific examples of the crosslinking accelerator, there can be mentioned sulfenamide crosslinking accelerators such as N-cyclohexyl-2-benzothazole sulfenamide, N-t-butyl-2-benzothazole sulfenamide, N-oxyethylene-2-benzothazole sulfenamide and N,N'-diidsopropyl-2-benzothazole sulfenamide; guanidine crosslinking accelerators such as diphenylguanidine, diorthotolylguanidine and orthotolylbiguanidine; thiourea crosslinking accelerators such as diethylthiourea; thiazole crosslinking accelerators such as 2-mercaptobenzothiazole, dibenzothiazyl disulfide and 2-mercaptobenzothiazole zinc salt; thiuram crosslinking accelerators such as tetramethylthiuram monosulfide and tetramethylthiuram disulfide; dithiocarbamate crosslinking accelerators such as sodium dimethyldithiocarbamate and zinc dimethyldithiocarbamate; and xanthogenate crosslinking accelerators such as sodium isopropylxanthogenate, zinc isopropylxanthogenate and zinc butylxanthogenate.

These crosslinking accelerators may be used either alone or as a combination of at least two thereof. Sulfenamide crosslinking accelerators are preferable. The amount of crosslinking accelerator is such that the lower limit thereof is preferably 0.1 part by weight, more preferably 0.3 part by weight and especially preferably 0.5 part by weight, and the upper limit thereof is preferably 15 parts by weight, more preferably 10 parts by weight and especially preferably 5 parts by weight, based on 100 parts by weight of the rubber ingredient.

The accelerator activator is not particularly limited, and includes, for example, higher fatty acids such as stearic acid, and zinc oxide. As zinc oxide, those which have a particle diameter of not larger than 5 $\mu$m and thus have a high surface activity are preferable. As specific examples of the preferable zinc oxide, there can be mentioned active zinc oxide having a particle diameter in the range of 0.05 to 0.2 $\mu$m and zinc oxide having a particle diameter in the range of 0.3 to 1 $\mu$m. The zinc oxide can be surface-treated with an amine dispersing agent or a wetting agent.

The accelerator activator may be used either alone or as a combination of at least two thereof. The amount of accelerator activator is appropriately chosen depending upon the particular kind of accelerator activator. The amount of a higher fatty acid is such that the lower limit thereof is preferably 0.05 part by weight, more preferably 0.1 part by weight and especially preferably 0.5 part by weight, and the upper limit thereof is preferably 15 parts by weight, more preferably 10 parts by weight and especially preferably 5 parts by weight, based on 100 parts by weight of the rubber ingredient. The amount of zinc oxide is such that the lower limit thereof is preferably 0.05 part by weight, more preferably 0.1 part by weight and especially preferably 0.5 part by weight, and the upper limit thereof is preferably 10 parts by weight, more preferably 5 parts by weight and especially preferably 2 parts by weight, based on 100 parts by weight of the rubber ingredient. When the amount of accelerator activator is within this range, a crosssslinked rubber product made from the rubber composition exhibits good and balanced processability, tensile strength and abrasion resistance.

Other ingredients, for example, activators such as diethylene glycol, polyethylene glycol and silicone oil, fillers such as calcium carbonate, talc and clay; and wax can be incorporated in the rubber composition.

The rubber composition of the present invention can be prepared by kneading the respective ingredients by a conventional procedure. For example, a rubber ingredient is mixed with ingredients other than a crosslinking agent and a crosslinking accelerator, and then, the rubber ingredient-mixture is mixed with a crosslinking agent and a crosslinking accelerator to give the rubber composition. The temperature at which a rubber ingredient is mixed with ingredients other than a crosslinking agent is such that the lower limit thereof is preferably 80° C., more preferably 100° C. and especially preferably 140° C., and the upper limit thereof is preferably 200° C., more preferably 190° C. and especially preferably 180° C. The time for which a rubber ingredient is mixed with ingredients other than a crosslinking agent is such that the lower limit thereof is preferably 30 seconds and more preferably 1 minute, and the upper limit thereof is preferably 30 minutes. Mixing of a crosslinking agent and a crosslinking accelerator with the rubber-containing mixture is carried out after the rubber-containing mixture is cooled usually to a temperature not higher than 100° C., preferably not higher than 80° C.

Cross-Linked Article

The rubber composition of the present invention is generally used as a crosslinked rubber article made therefrom. The rubber composition used has incorporated therein a crosslinking agent, a crosslinking accelerator and other ingredients required for crosslinking.

The procedure for crosslinking is not particularly limited, and may be chosen depending upon the particular shape and size of a crosslinked rubber article. A crosslinkable rubber composition can be filled and heated in a mold whereby crosslinking is effected simultaneously with shaping into a crosslinked rubber article. Alternatively, a crosslinkable rubber composition can be preliminarily shaped into a rubber article, and then the article is heated to be thereby crosslinked.

The crosslinking temperature and tine are also not particularly limited, and may be chosen depending upon the particular shape and size of a crosslinked rubber article. The crosslinking temperature is generally such that the lower limit thereof is preferably 120° C., more preferably 140° C., and the upper limit thereof is preferably 200° C., more preferably 180° C.

The invention will now be specifically described by the following production examples, examples and comparative examples. In these examples, parts are by weight. The properties of polymers, process oil and rubbers are evaluated by the following methods.

(1) Total Acid Value of Process Oil

The total acid value (mgKOH/g) of process oil was measured by a potentiometric titration method according to JIS K2501.

(2) Bound Styrene Content in Polymer

The content (%) of bound styrene in a polymer was determined by a refractive index method according to K6383.

(3) Vinyl Bond Unit Content in Conjugated Diene Units

The content (%) of vinyl bond units in conjugated diene units of a polymer bound was determined by infrared spectrophotometry (Hampton method).

(4) Molecular Weight of Polymer

The weight average molecular weight (Mw) and number average molecular weight (Mn) of a polymer were measured by GPC and expressed in terms of those of polystyrene. The weight average molecular weight (Mw) and molecular weight distribution (Mw/Mn) of a polymer were determined.

(5) Sequence Distribution of Styrene Units

The sequence distribution of styrene units was determined by the method described in Preprint of Polymer Society of Japan, vol. 29, No. 9, P2055-. Namely, a copolymer was subjected to ozonolysis and the product was measured by GPC. The content (%) of an isolated short chain comprised of one styrene unit, and the content (%) of a long sequence composed of at least eight styrene units, in the total styrene units, were calculated.

(6) Tensile Strength

The tensile strength of rubber was expressed by the modulus in tension at an elongation of 300% (kgf/cm$^2$). The 300% modulus in tension was measured according to JIS K6301, and was expressed by an index number (tensile strength index number). The larger the index number, the more preferable the rubber.

(7) Heat Build-Up

Tan δ was measured at a twist of 0.5%, a frequency of 20 Hz, and a temperatures of 0° C. and 60° C. by using "RDA-II" available from Rheometrios Co. The heat build-up-was expressed by an index number (heat build-up index number) of the ratio of tan δ (0° C.)/tan δ (60° C.) as the tan δ ratio of a comparative example is 100. The larger the heat build-up, index number, the more preferable the heat build-up of rubber.

(8) Abrasion Resistance

The abrasion resistance of rubber was measured according to ASTM D2228 by using a Pico abrasion machine. The abrasion resistance was expressed by an index number (abrasion resistance index number). The larger the abrasion resistance index number, the more preferable the abrasion resistance of rubber.

PRODUCTION EXAMPLE 1

Production of Conjugated Diene Rubber 1 and Oil-Extended Rubber 1

An autoclave equipped with a stirrer was charged with 4,000 g of cyclohexane, 140 g of styrene, 460 g of 1,3-butadiene and 12 milli-mole of tetramethylethylenediamine, followed by addition of 4.66 milli-mole of n-butyllithium to initiate polymerization at 40° C. When 20 minutes elapsed from the commencement of polymerization, a mixture of 70 g of styrene and 330 g of 1,3-butadiene was continuously added. After it was checked that the conversion reached 100%, 0.42 milli-mole of tetramethoxysilane was added and a reaction was conducted for 30 minutes. The highest temperature of a polymerization mixture was 60° C. After completion of the reaction, 10 milli-mole of methanol as a terminator was added to give a polymer solution.

A part of the polymer solution was collected, and then dropped into methanol to precipitate a rubber ingredient. The rubber ingredient was dried by a vacuum drier. Thus, a small amount of conjugated diene rubber (rubber 1) was obtained. Molecular weight and other properties of rubber 1 are shown in Table 1.

To the above-mentioned polymer solution, 0.2 part of 2,4-bis(n-octylthiomethyl)-6-methylphenol and 37.5 parts of process oil (oil 1 shown in Table 2), each per 100 parts of rubber 1 in the polymer solution, were added. A polymer was recovered by a steam-stripping method, dehydrated by rolls and then dried by a hot air dryer to give oil-extended rubber 1. Oil-extended rubber 1 had a Mooney viscosity of 55. At the stripping step, polyoxyethylene polyoxypropylene ether was added to water in a stripping zone in an amount such that the concentration thereof was 20 ppm, and the concentration of a crumb-form oil-extended rubber was 5% by weight based on the weight of water in the stripping zone.

PRODUCTION EXAMPLE 2 to 5

Production of Oil-Extended Rubbers 2 to 5

By the same procedures as described in Production Example 1, rubber 1 was extended with process oil wherein oil 2, oil 3, oil 4 and oil 5 were used in Production Examples 2, 3, 4 and 5, respectively, to obtain oil-extended rubbers 2, 3, 4 and 5, with all other conditions remaining the same. The Mooney viscosities of oil-extended rubbers 2, 3, 4 and 5 were 56, 51, 53 and 45, respectively.

PRODUCTION EXAMPLE 3 TO 5

Production of Conjugated Diene Rubber 2 and Oil-Extended Rubbers 6 and 7

An autoclave equipped with a stirrer was charged with 4,000 g of cyclohexane, 160 g of styrene, 440 g of 1,3-butadiene and 12 milli-mole of tetramethylethylenediamine, followed by addition of 5.00 milli-mole of n-butyllithium to initiate polymerization at 40° C. When 15 minutes elapsed from the commencement of polymerization, a mixture of 90 g of styrene and 310 g of 1,3-butadiene was continuously added. After it was checked that the conversion reached 100%, 0.74 milli-mole of tetramethoxysilane was added and a reaction was conducted for 30 minutes. The highest temperature of a polymerization mixture was 60° C. After completion of the reaction, 10 milli-mole of methanol as a terminator was added to give a polymer solution.

A part of the polymer solution was collected, and then dropped into methanol to precipitate a rubber ingredient. The rubber ingredient was dried by a vacuum drier. Thus, a small amount of a conjugated diene rubber (rubber 2) was obtained. Molecular weight and other properties of rubber 2 are shown in Table 1.

By the same procedures as described in Production Example 1, rubber 2 in place of rubber 1 was extended with process oil wherein oil 1 and oil 3 were used in Production Examples 6 and 7, respectively, to obtain oil-extended rubbers 6 and 7, with all other conditions remaining the same. The Mooney viscosities of oil-extended rubbers 6 and 7 were 45 and 44, respectively.

PRODUCTION EXAMPLE 8

Production of Conjugated Diene Rubber 3 and Oil-Extended Rubber 8

Two autoclaves (first and second autoclaves) each equipped with a stirrer were connected in series. A mixture of styrene and 1,3-butadiene (weight ratio 25/75), 400 g of cyclohexane per 100 g of the styrene/1,3-butadiene mixture, and 0.17 g of tetramethylethylenediamine, 0.034 g of n-butyllithium, 0.43 g of 1,2-butadiene and 0.9 g of divinylbenzene, each per 100 g of the styrene/1,3-butadiene mixture, were continuously fed into the first autoclave to effect polymerization. The feed rate was controlled so that the average residence time in each autoclave was 2 hours. The first and second autoclaves were maintained at a temperature of 55° C. and 80° C., respectively. After completion of the reaction, 0.034 g of methanol, per long of the styrene/1,3-butadiene mixture, as a terminator was added to give a polymer solution. By the same procedures as described in Production Example 1, a small amount of conjugated diene rubber (rubber 3) was obtained. Molecular weight and other properties of rubber 3 are shown in Table 1.

To the above-mentioned polymer solution, 0.1 part of 2,6-di-t-butylphenol and 37.5 parts of process oil (oil 4 shown in Table 2), each per 100 parts of rubber 3 in the polymer solution, were added. A polymer was recovered by a steam-stripping method in the same manner as in Production Example 1, dehydrated by rolls and then dried by a hot air dryer to give oil-extended rubber 8. Oil-extended rubber 8 had a Mooney viscosity of 50.

PRODUCTION EXAMPLE 9

Production of Conjugated Diene Rubber 4 and Oil-Extended Rubber 9

By the same procedures as described in Production Example 8, conjugated diene rubber 4 and oil-extended rubber 9 were produced wherein divinylbenzene was not added and 0.20 g of tetramethoxysilane, per 100 g of the styrene/1,3-butadiene mixture, was continuously fed to the second autoclave, and oil 6 shown in Table 2 was used as process oil, with all other conditions remaining the same. Molecular weight and other properties of rubber 4 are shown in Table 1. Oil-extended rubber 9 had a Mooney viscosity of 60.

PRODUCTION EXAMPLE 10

Production of Conjugated Diene Rubber 5 and Oil-Extended Rubber 10

An autoclave equipped with a stirrer was charged with 4,000 g of cyclohexane, 150 g of styrene, 450 g of 1,3-butadiene and 10 milli-mole of tetramethylethylenediamine, followed by addition of 6.3 milli-mole of n-butyllithium to initiate polymerization at 50° C. When 10 minutes elapsed from the commencement of polymerization, a mixture of 50 g of styrene and 350 g of 1,3-butadiene was continuously added. After it was checked that the conversion reached 100%, 1.1 milli-mole of tetramethoxysilane was added and a reaction was conducted for 30 minutes. The highest temperature of a polymerization mixture was 80° C. After completion of the reaction, 10 milli-mole of methanol as a terminator was added to give a polymer solution. A small amount of rubber 5 was obtained from the thus-produced polymer solution. Molecular weight and other properties of rubber 5 are shown in Table 1.

To the above-mentioned polymer solution, 0.1 part of 2,6-di-t-butylphenol and 37.5 parts of process oil (oil 5 shown in Table 2), each per 100 parts of rubber 5 in the polymer solution, were added. A polymer was recovered by a steam-stripping method in the same manner as in Production Example 1, dehydrated by rolls and then dried by a hot air dryer to give oil-extended rubber 10. Oil-extended rubber 10 had a Mooney viscosity of 37.

PRODUCTION EXAMPLE 11

Production of Conjugated Diene Rubber 6 and Oil-Extended Rubber 11

An autoclave equipped with a stirrer was charged with 4,000 g of cyclohexane, 150 g of styrene, 720 g of 1,3-butadiene and 2.6 milli-mole of tetramethylethylenediamine, followed by addition of 7.6 milli-mole of n-butyllithium to initiate polymerization at 40° C. When 40 minutes elapsed from the commencement of polymerization, 130 g of 1,3-butadiene was continuously added. After it was checked that the conversion reached 100%, 5.3 milli-mole of tin tetrachloride was added and a reaction was conducted for 5 minutes. Further, 4.8 milli-mole of N,N'-diemthylethylene urea was added and a reaction was conducted for 20 minutes. After completion of the reaction, 20 milli-mole of methanol as a terminator was added to give a polymer solution. A small amount of rubber 6 was obtained from the thus-produced polymer solution. Molecular weight and other properties of rubber 6 are shown in Table 1.

To the above-mentioned polymer solution, 0.1 part of 2,6-di-t-butylphenol and 37.5 parts of process oil (oil 5 shown in Table 2), each per 100 parts of rubber 6 in the polymer solution, were added. A polymer was recovered by a steam-stripping method in the same manner as in Production Example 1, dehydrated by rolls and then dried by a hot air dryer to give oil-extended rubber 11. Oil-extended rubber 11 had a Mooney viscosity of 12.

PRODUCTION EXAMPLE 12

Production of Conjugated Diene Rubber 7 and Oil-Extended Rubber 12

By the same procedures as described in Production Example 2, rubber 7 was produced wherein tin tetrachloride was used instead of tetramethoxysilane with all other conditions remaining the same. Molecular weight and other properties of rubber 7 are shown in Table 1.

To the thus-obtained polymer solution, 0.2 part of 2,4-bis (n-octylthiomethyl)-6-methylphenol was added per 100 parts of rubber 7 in the polymer solution. To 100 parts of oil 3, 4 milli-mole of lithium hydroxide was added and the mixture was stirred at 50° C. for 24 hours to give oil 7. 37.5 parts of oil 7 as process oil, per 100 parts of rubber 7 in the polymer solution, was added to the polymer solution. A polymer was recovered by a steam-stripping method in the same manner as in Production Example 1, dehydrated by rolls and then dried by a hot air dryer to give oil-extended rubber 12. Oil-extended rubber 12 had a Mooney viscosity of 44. Total acid value and other properties of oil 7 are shown in Table 2.

PRODUCTION EXAMPLE 13

Production of Conjugated Diene Rubber 8 and Oil-Extended Rubber 13

By the same procedures as described in Production Example 10, rubber 8 was produced wherein tin tetrachloride was used instead of tetramethoxysilane with all other conditions remaining the same. Molecular weight and other properties of rubber 7 are shown in Table 1. By the same procedures as described in Production Example 10, oil-extended rubber 13 was produced wherein oil 4 was used as process oil with all other conditions remaining the same. Oil-extended rubber 13 had a Mooney viscosity of 32.

TABLE 1

| Rubber No. | 1 | 2 | 3 | 4 | 5 | 6 | 7 | 8 |
|---|---|---|---|---|---|---|---|---|
| Content of bound styrene (%) | 21.2 | 25.0 | 25.4 | 32.3 | 19.8 | 15.0 | 24.9 | 20.2 |
| Content of vinyl bond units (%)*1 | 70.2 | 70.1 | 69.9 | 36.6 | 60.7 | 42.4 | 70.2 | 59.8 |
| Content of isolated styrene unit (%)*2 | 87 | 88 | 61 | 58 | 88 | 69 | 86 | 87 |
| Content of long styrene sequence (%)*3 | 0 | 0 | 1.4 | 1.8 | 0 | 0.3 | 0 | 0 |
| Mw/10,000 | 80 | 75 | 66 | 70 | 72 | 40 | 78 | 71 |
| Mw/Mn | 1.7 | 1.8 | 2.4 | 3.2 | 1.7 | 1.6 | 1.8 | 1.8 |
| Coupling percent (%) | 43 | 50 | 0 | 0 | 58 | 30 | 52 | 54 |

*1Content of vinyl bond units in the conjugated diene units (%)
*2Content of isolated short chain of styrene unit (%)
*3Content of long sequence of styrene units (%)

Rubbers 1, 2 and 5 to 8 have a vinyl bond unit content of at least 20% and a molecular weight distribution (Mw/Mn) of not larger 2.2, and thus, these rubbers can be used in the present invention as they are. Rubbers 3 and 4 have a vinyl bond unit content of at least 20%, but have a molecular weight distribution (Mw/Mn) of larger 2.2.

TABLE 2

| Oil No. | 1 | 2 | 3 | 4 | 5 | 6 | 7 |
|---|---|---|---|---|---|---|---|
| Total acid value | 0.3 | 0.3 | 0.2 | 5.4 | 0.01 | 0.2 | 0 |
| Pour point | 5 | −2.5 | 27 | −2.5 | −18 | 18 | 27 |
| CA % | 45 | 44 | 27 | 39 | 6 | 44 | 27 |
| CN % | 27 | 32 | 32 | 32 | 37 | 25 | 32 |
| CP % | 28 | 24 | 41 | 29 | 58 | 31 | 41 |
| Polycyclic structure content | 5.7 | 6.6 | 2.1 | 11.8 | 1.0 | 6.9 | 2.2 |

Oils 1 to 3, 6 and 7 have a total acid value of not larger than 1.0 mgKOH/g, a pour point of not higher than 50° C. and CA% of at least 20%, and thus, are used in the present invention. Oil 5 has a small CA%, i.e., 6%. Oil 4 has a large total acid value, i.e., that is larger than 1.0 mgKOH/g.

EXAMPLES 1 TO 3, COMPARATIVE EXAMPLES 6 and 7

Using each of oil-extended rubbers 1 to 5 as a raw material rubber, a rubber composition was prepared. That is, 137.5 parts of a raw material rubber (comprised of 100 parts of rubber ingredient and 37.5 parts of process oil), 80 parts of carbon black N220 ("Seast 6"® available from Tokai Carbon K.K., nitrogen adsorption specific-surface area: 119 m²/g, DBP adsorption specific surface area 114 ml/100 g), 3 parts of zinc oxide, 2 parts of stearic acid and 2 parts of antioxidant [N-(1,3-dimethylbutyl-N'-phenyl-p-phenylenediamine)] were kneaded together at 140° C. for 4 minutes by a 250 ml Brabender mixer.

Then the kneaded mixture was kneaded together with 1.4 parts of sulfur and 1.6 parts of crosslinking accelerator (N-cyclohexyl-2-benzothiazolesulfenamide) at 50° C. by open rolls to prepare rubber compositions 1 to 5.

Each of the thus-prepared rubber compositions 1 to 5 was press-cured at 160° C. for 15 minutes to prepare a sheet with a thickness of 2 mm and a test specimen for Pico abrasion test. Properties of the thus-crosslinked rubber were evaluated. The evaluation results are expressed in Table 3 by an index number as the results in Comparative Example 1 are 100.

TABLE 3

| | Examples | | | Comp. Ex. | |
|---|---|---|---|---|---|
| | 1 | 2 | 3 | 1 | 2 |
| Oil-unextended rubber No. | 1 | 1 | 1 | 1 | 1 |
| Process oil No. | 1 | 2 | 3 | 4 | 5 |
| Oil-extended rubber No. | 1 | 2 | 3 | 4 | 5 |
| Rubber composition No. | 1 | 2 | 3 | 4 | 5 |
| Tensile strength index | 110 | 109 | 113 | 100 | 120 |
| Heat build-up index | 102 | 103 | 101 | 100 | 100 |
| Abrasion resistance index | 108 | 108 | 104 | 100 | 88 |

EXAMPLES 4 and 5, COMPARATIVE EXAMPLES 3 and 6

Using each of oil-extended rubbers 6 to 11 as a raw material rubber, a rubber composition was prepared. That is, 137.5 parts of a raw material rubber (comprised of 100 parts of rubber ingredient and 37.5 parts of process oil), 40 parts of silica ("Zeosil"® 1165MP available from Rhodia Co.), and 3.2 parts of a silane coupling agent (Si69 available from Degussa Huls AG.) were kneaded together at 150° C. for 2 minutes by a 250 ml Brabender mixer. Then, to the kneaded mixture, 40 parts of silica ("Zeosil"® 1165MP available from Rhodia Co.), 3.2 parts of a silane coupling agent (Si69 available from Degussa Co.), 1.5 parts of zinc oxide, 2 parts of stearic acid and 2 parts of an antioxidant ("Nocrac"® 6C, available from Ouchi Shinko K.K., N-(1,3-dimethylbutyl-N'-phenyl-p-phenylenediamine)) were added and the mixture was further kneaded at 150° C. for 3 minutes. Then, to the thus-obtained mixture, 1.4 parts of sulfur, and 3.5 parts of a crosslinking accelerator, (a mixture of 1.7 parts of N-cyclohexyl-2-benzothiazolesulfenamide and 1.8 parts of diphenylguanidine), were added and kneaded together at 50° C. by open rolls to prepare rubber compositions 6 to 11.

Each of the thus-prepared rubber compositions 6 to 11 was press-cured at 160° C. for 15 minutes to prepare a sheet with a thickness of 2 mm and a test specimen for Pico abrasion test. Properties of the thus-crosslinked rubber were evaluated. The evaluation results are expressed in Table 4 by an index number as the results in Comparative Example 3 are 100.

TABLE 4

|  | Examples | | Comparative Examples | | | |
| --- | --- | --- | --- | --- | --- | --- |
|  | 4 | 5 | 3 | 4 | 5 | 6 |
| Oil-unextended rubber No. | 2 | 2 | 3 | 4 | 5 | 6 |
| Process oil No. | 1 | 3 | 4 | 6 | 5 | 5 |
| Oil-extended rubber No. | 6 | 7 | 8 | 9 | 10 | 11 |
| Rubber composition No. | 6 | 7 | 8 | 9 | 10 | 11 |
| Tensile strength index | 115 | 119 | 100 | 98 | 110 | 104 |
| Heat build-up index | 114 | 117 | 100 | 92 | 93 | 68 |
| Abrasion resistance index | 110 | 105 | 100 | 111 | 96 | 91 |

EXAMPLES 6 to 8, COMPARATIVE EXAMPLES 7 to 10

Using each of oil-extended rubbers 6 to 10, 12 and 13 as a raw material rubber, a rubber composition was prepared. That is, 110 parts of a raw material rubber, 20 parts of butadiene rubber ("Nipol"® BR-1220, available from Nippon Zeon Co., Mooney viscosity: 43, cis-bond content: at lesat 98%), 40 parts of silica shown in Table 5, and 3.2 parts of a silane coupling agent (Si69 available from Degussa Huls AG.) were kneaded together at 150° C. for 2 minutes by a 250 ml Brabender mixer.

Then, to the kneaded mixture, 40 parts of silica shown in Table 5, 10 parts of carbon black N220, 10 parts of process oil shown in Table 5 as incorporated oil, 2 parts of a silane coupling agent (Si69 available from Degussa Co.), 1.5 parts of zinc oxide, 2 parts of stearic acid and 2 parts of an antioxidant ("Nocrac"® 6C, available from Ouchi Shinko K.K.) were added and the mixture was further kneaded at 150° C. for 3 minutes.

Then, to the thus-obtained mixture, 1.4 parts of sulfur, and 3.2 parts of a crosslinking accelerator, (a mixture of 1.7 parts of "Nocceler"® CZ, available-from Ouchi Shinko K.K., N-cyclohexyl-2-benzothiazylsulfenamide and 1.5 parts of "Noccceler"® D, available from Ouchi Shinko K.K., diphenylguanidine), were added and kneaded together at 50° C. by open rolls to prepare rubber compositions 12 to 18.

Each of the thus-prepared rubber compositions 12 to 18 was press-cured at 160° C. for 15 minutes to prepare a sheet with a thickness of 2 mm and a test specimen for Pico abrasion test. Properties of the thus-crosslinked rubber were evaluated. The evaluation results are expressed in Table 5 by an index number as the results in Comparative Example 7 are 100.

TABLE 5

|  | Examples | | Comparative Examples | | | | |
| --- | --- | --- | --- | --- | --- | --- | --- |
|  | 4 | 5 | 3 | 4 | 5 | 6 | |
| Oil-unextended rubber No. | 2 | 2 | 7 | 3 | 4 | 5 | 8 |
| Process oil No. | 1 | 3 | 7 | 4 | 6 | 5 | 4 |
| Oil-extended rubber No. | 6 | 7 | 12 | 8 | 9 | 10 | 13 |
| Rubber composition No. | 12 | 13 | 14 | 15 | 16 | 17 | 18 |
| Silica | MP | MP | MP | MP | VN | VN | VN |
| Incorporated oil No. | 1 | 3 | 7 | 4 | 5 | 6 | 4 |
| Tensile strength index | 111 | 115 | 115 | 100 | 93 | 102 | 95 |
| Heat build-up index | 118 | 126 | 134 | 100 | 73 | 78 | 58 |
| Abrasion resistance index | 113 | 107 | 109 | 100 | 102 | 89 | 100 |

Abbreviations in Table 5 are as follows.
VN "Npsil" ™ VN3, available from Nippon Silica K.K., nitrogen adsorption specific surface area 240 m$^2$/g
MP "Zeosil" ™ 1165MP, available from Rhodia Co., nitrogen adsorption specific surface area 175 m$^2$/g Among the rubbers used in the Comparative Examples, rubber 3 and rubber 4 have a too large molecular weight distribution and cannot be used alone in the present invention.

In Comparative Examples 3 and 7, only rubber 3 was used as the rubber ingredient. In Comparative Examples 4 and 8, rubber 4 was used as the rubber ingredient. These rubbers do not contain a conjugated diene rubber having a molecular weight distribution (Mw/Mn) of 1.2 to 2.2. In Comparative Examples 1, 3, 7 and 10, oil 4 was used as process oil, which had a too large total acid value as compared with that of process oil used in the present invention. In Comparative Examples 2, 5, 6 and 9, oil 5 was used as process oil, which had a too small aromatic carbon content as compared with that of process oil used in the present invention.

As seen from comparison of the examples with comparative examples, crosslinked rubbers of the examples exhibited tensile strength index, heat build-up index and abrasion resistance index, all of which were larger than the standard value in comparative examples. In contrast, crosslinked rubbers of the comparative examples exhibited these characteristics, at least one of which was smaller than the standard value in comparative examples. It is to be noted that a silica-incorporated rubber composition exhibited excellent heat build-up.

INDUSTRIAL APPLICABILITY

The rubber composition of the present invention gives a crosslinked rubber product having high tensile strength, high abrasion resistance and reduced heat build-up. Therefore, the rubber composition is suitable for automobile tire material. Especially silica incorporated rubber composition is useful for an automobile tire having a reduced fuel consumption.

What is claimed is:

1. An oil-extended rubber comprising 100 parts by weight of a rubber ingredient comprising a conjugated diene rubber wherein the ratio (Mw/Mn) of weight average molecular weight (Mw) to number average molecular weight (Mn), as measured by gel permeation chromatography and expressed in terms of those of polystyrene, is in the range of 1.2 to 2.2, and the conjugated diene monomer units have a vinyl bond unit content of at least 20%, and 5 to 100 parts by weight of a process oil having a total acid value of not larger than 1.0 mgKOH/g, a pour point of not higher than 50° C. and an aromatic carbon content of at least 20% as measured by the Kurtz analysis method.

2. An oil-extended rubber according to claim 1, wherein the content of the conjugated diene rubber is in the range of 50 to 100% by weight based on the weight of the rubber ingredient.

3. An oil-extended rubber according to claim 1, wherein the conjugated diene rubber is a polymer of a conjugated diene monomer or monomers, or a copolymer of a conjugated diene monomer with a monomer copolymerizable with the conjugated diene monomer.

4. An oil-extended rubber according to claim 3, wherein the conjugated diene rubber is a copolymer of a conjugated diene monomer with a monomer copolymerizable therewith, wherein the content of an isolated short chain of a copolymerizable monomer unit is in the range of 50 to 100% by weight.

5. An oil-extended rubber according to claim 3, wherein the conjugated diene rubber is a copolymer of a conjugated diene monomer with a monomer copolymerizable therewith, wherein the content of a long sequence of copolymerizable monomer units is in the range of 0 to 2% by weight.

6. An oil-extended rubber according to claim 1, wherein the conjugated diene rubber has a weight average molecular weight (Mw) of 200,000 to 2,000,000.

7. An oil-extended rubber according to claim 1, wherein the amount of the process oil is in the range of 5 to 60 parts by weight.

8. An oil-extended rubber according to claim 1, wherein the oil-extended rubber has a Mooney viscosity of 20 to 100.

9. A process for producing an oil-extended rubber as claimed in claim 1, which comprises the steps of:
   (1) polymerizing a conjugated diene monomer or monomers alone, or a combination of a conjugated diene monomer or monomers with a monomer copolymerizable therewith by using an organic active metal initiator in the presence of a polar compound in a hydrocarbon medium,
   (2) adding a terminator to a polymerization system to terminate the polymerization,
   (3) adding 5 to 100 parts by weight, based on 100 parts by weight of the total monomers, of a process oil having a total acid value of not larger than 1.0 mgKOH/g, a pour point of not higher than 50° C. and an aromatic carbon content of at least 20% as measured by the Kurtz analysis method, and
   (4) removing the hydrocarbon medium and recovering the thus-produced oil-extended rubber.

10. A rubber composition comprising (i) 100 parts by weight of a rubber ingredient comprising a conjugated diene rubber wherein the ratio (Mw/Mn) of weight average molecular weight to number-average molecular weight (Mn), as measured by gel permeation chromatography and expressed in terms of those of polystyrene, is in the range of 1.2 to 2.2, and the conjugated diene monomer units have a vinyl bond unit content of at least 20%, (ii) 5 to 100 parts by weight of a process oil having a total acid value of not larger than 1.0 mgKOH/g, a pour point of not higher than 50° C. and an aromatic carbon content of at least 20% as measured by the Kurtz analysis method, and (iii) 10 to 200 parts by weight of a reinforcing agent.

11. A rubber composition according to claim 10, wherein the amount of the conjugated diene rubber is in the range of 50 to 100% by weight based on the weight of the rubber ingredient.

12. A rubber composition according to claim 10, wherein the conjugated diene rubber is a polymer of a conjugated diene monomer or monomers, or a copolymer of a conjugated diene monomer with a monomer copolymerizable with the conjugated diene monomer.

13. A rubber composition according to claim 12, wherein the conjugated diene rubber is a copolymer of a conjugated diene monomer with a monomer copolymerizable therewith, wherein the content of an isolated short chain of a copolymerizable monomer unit is in the range of 50 to 100% by weight.

14. A rubber composition according to claim 12, wherein the conjugated diene rubber is a copolymer of a conjugated diene monomer with a monomer copolymnerizable therewith, wherein the content of a long sequence of copolymnerizable monomer units is in the range of 0 to 2% by weight.

15. A rubber composition according to claim 11, wherein the conjugated diene rubber has a weight average molecular weight (Mw) of 200,000 to 2,000,000.

16. A rubber composition according to claim 10, wherein the reinforcing agent is at least one member selected from the group consisting of silica and carbon black.

17. A rubber composition according to claim 16, wherein the silica has a nitrogen absorption specific surface area of 50 to 400 m²/g as measured by the BET method.

18. A rubber composition according to claim 16, wherein the carbon black has a nitrogen absorption specific surface area of 5 to 200 m²/g as measured by the BET method.

19. A rubber composition according to claim 16, wherein the carbon black has a dibutyl phthalate absorption of 5 to 300 ml/100 g.

20. A rubber composition according to claim 16, wherein the reinforcing agent comprises both of-silica and carbon black, the ratio of silica/carbon black being in the range of 10/90 to 99/1 by weight.

21. A crosslinked rubber article made by crosslinking a rubber composition as claimed in claim 10.

* * * * *